United States Patent Office 3,388,168
Patented June 11, 1968

3,388,168
1 - (α - METHOXYCYCLOPENTOXY)METHYL-
2 - METHYL - 3 - ETHYL - 4 - PHENYL - 4-
CYCLOHEXENE
Alexander Mebane, New York, N.Y., assignor to Ortho Pharmaceutical Corporation, a corporation of New Jersey
No Drawing. Original application Mar. 8, 1966, Ser. No. 532,581, now Patent No. 3,344,147, dated Sept. 26, 1967. Divided and this application Jan. 31, 1967, Ser. No. 612,772
1 Claim. (Cl. 260—611)

ABSTRACT OF THE DISCLOSURE

1 - (α - methoxycyclopentoxy)methyl-2-methyl-3-ethyl-4-phenyl-4-cyclohexene is an agent for the reduction of fertility in female animals.

This application is a divisional application of my copending application Ser. No. 532,581 filed Mar. 8, 1966 and now Patent No. 3,344,147, which is a continuation-in-part of my application Ser. No. 265,071 filed Mar. 14, 1963 (now abandoned).

The compound of the invention has the following formula:

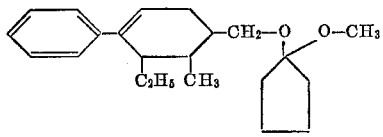

The compound of the invention is an active oral antilittering agent in rats, mice, rabbits and dogs fed with a diet containing the compound. In particular, the compound of the invention suppresses the fertility of female animals.

The following examples are given by way of illustration only and are not to be construed as limiting.

EXAMPLE I 2-methyl-3-ethyl-4-phenyl-4-hydroxycyclohexanecarboxylic acid

A solution of 11.7 grams (0.0635 mole) of 2-ethyl-3-methyl-4-carboxycyclohexanone in 90 ml. of dry tetrahydrofuran is added over a period of four minutes to a stirred solution of phenyl-magnesium bromide in 50 ml. of dry ether and 120 ml. of dry tetrahydrofuran, prepared from 20 ml. (0.189 mole) of bromobenzene. The temperature of the reaction mixture during the addition is kept below —25° C. After addition is complete, the reaction mixture is brought to reflux temperature over a period of 45 minutes, and boiled under reflux for 30 minutes. The reaction mixture is then cooled to —30° C. and 100 ml. of aqueous, saturated ammonium chloride solution is slowly added. The reaction mixture is acidified with concentrated hydrochloric acid and the aqueous layer is removed and extracted with 90 ml. of ethyl acetate and this extract is added to the non-aqueous layer. The combined non-aqueous layers are shaken with 150 ml. of half-saturated, aqueous sodium chloride solution, then concentrated under vacuum to a volume of about 50 ml. Fifty ml. of ether is added to the concentrate and the resulting solution is extracted with 65 ml. of normal, aqueous sodium hydroxide solution and then with 70 ml. of half-normal, aqueous sodium hydroxide solution (a total of 0.1 mole) and finally with 50 ml. of water. The combined aqueous extracts are acidified with dilute hydrochloric acid and extracted three times with 50 ml. amounts of methylene chloride. The combined extracts are washed with water and filtered through a mixture of equal parts of Nuchar and magnesium sulfate. The solvent is removed under vacuum at room temperature from the filtrate, leaving a residue of 9.3 grams of crude 2-methyl-3-ethyl-4-phenyl-4-hydroxycyclohexanecarboxylic acid.

EXAMPLE II

2 - methyl-3-ethyl-4-phenyl-4-cyclohexenecarboxylic acid and 2-methyl-3-ethyl-4-phenyl-3-cyclohexenecarboxylic acid The 9.3 grams of crude 2-methyl-3-ethyl-4-phenyl-4-hydroxycyclohexanecarboxylic acid (prepared as in Example I) is dissolved in 95 ml. of hot glacial acetic acid and brought to boiling temperature. One-half gram of para-toluenesulfonic acid is added and the solution is boiled for 13 minutes. Seventy-eight ml. of warm water is added and the solution is allowed to cool, then chilled to —5° C. The crystalline product which forms is removed by filtration, washed with 5 ml. of a cold fifty percent aqueous solution of acetone and then with 5 ml. of hexane. After drying, 2.9 grams of a crude crystalline mixture of 2 - methyl-3-ethyl-4-phenyl-4-cyclohexenecarboxylic acid and 2-methyl-3-ethyl-4-phenyl-3-cyclohexenecarboxylic acid is obtained. The crude crystalline material is dissolved in 50 ml. of hot acetone and filtered through Nuchar. Thirty-five ml. of hot water is added to the hot filtrate to produce slight turbidity; the resulting solution is allowed to cool slowly to room temperature. Colorless needles of 2-methyl-3-ethyl-4-phenyl-4-cyclohexenecarboxylic acid form and are removed by filtration. The crystalline material (1.85 g.) has a melting point of 158°–163° C.

*Analysis.*—Calcd. for $C_{16}H_{20}O_2$: C, 78.65; H, 8.25. Found: C, 78.47; H, 8.23.

The filtrate from above is concentrated to 20 ml. by boiling and then allowed to cool slowly, and finally is chilled to —5° C. Diamond-shaped prisms (0.41 g.) of 2 - methyl-3-ethyl-4-phenyl-3-cyclohexenecarboxylic acid form and are removed by filtration and washed with 5 ml. of hexane. The crystalline material has a melting point of 137°–144° C.

EXAMPLE III (2-methyl-3-ethyl-4-phenyl-4-cyclohexenyl)methanol

Two grams of 2-methyl-3-ethyl-4-phenyl-4-cyclohexenecarboxylic acid and 30 ml. of tetrahydrofuran are placed in a 125 ml. suction flask. To the mixture is added 600 mg. of lithium aluminum hydride. An exothermic reaction takes place. Upon cooling, the resultant lumps are crushed and permitted to stand overnight. The reaction product is poured, with stirring, into an 800 ml. beaker containing 250 ml. of 5% hydrochloric acid mixed with ice. Three methylene chloride extractions are made, which on concentration under vacuum yield 1.95 grams of (2-methyl-3-ethyl-4-phenyl-4-cyclohexenyl)methanol in the form of a cloudy, yellow viscous syrup, B.P. 101°/25μ.

Following the same procedure, (2-methyl-3-ethyl-4-phenyl-3-cyclohexenyl)methanol is prepared from 2-methyl-3-ethyl-4-phenyl-3-cyclohexenecarboxylic acid.

EXAMPLE IV 1-(α-methoxycyclopentoxy)methyl-2-methyl-3-ethyl-4-phenyl-4-cyclohexene Seven-tenths of one gram of (2-methyl-3-ethyl-4-phenyl-4-cyclohexenyl)methanol, as obtained in Example III, is dissolved in 7 ml. of chloroform. To this solution is added 1.4 ml. of cyclopentanone dimethyl ketal, three drops of methanol and 2 mg. of sulphosalicylic acid. The lemon-yellow solution is heated on a steam bath for thirteen minutes, until foaming decreases and the color becomes slightly brownish. The solution is made alkaline with two drops of N-ethylmorpholine, is evacuated to remove chloroform and is diluted with 20 ml. of ammoniacal water. The methylene chloride extracts are filtered through anhydrous potassium carbonate and concentrated under vacuum to give 1.0 gram of 1-(α-methoxycyclopentoxy)methyl - 2 - methyl-3-ethyl-4-phenyl-4-cyclohexene as a yellow syrup.

What is claimed is:
1. 1-(α-methoxycyclopentoxy)methyl - 2 - methyl-3-ethyl-4-phenyl-4-cyclohexene.

References Cited
UNITED STATES PATENTS 3,344,147  9/1967  Mebane _____ 260—326.5

BERNARD HELFIN, *Primary Examiner.*